United States Patent
Matsudo et al.

(10) Patent No.: US 11,801,601 B2
(45) Date of Patent: Oct. 31, 2023

(54) SUPPORTING APPARATUS FOR PROGRAMING A ROBOT OPERATION

(71) Applicant: DENSO WAVE INCORPORATED, Aichi-pref. (JP)

(72) Inventors: Anna Matsudo, Chita-gun (JP); Toshitaka Suzuki, Chita-gun (JP); Yuto Mitsuma, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 361 days.

(21) Appl. No.: 17/110,428

(22) Filed: Dec. 3, 2020

(65) Prior Publication Data
US 2021/0178586 A1    Jun. 17, 2021

(30) Foreign Application Priority Data
Dec. 16, 2019    (JP) .................................. 2019-226195

(51) Int. Cl.
*G05B 19/19*    (2006.01)
*B25J 9/16*    (2006.01)
*B25J 9/00*    (2006.01)

(52) U.S. Cl.
CPC ........... *B25J 9/1664* (2013.01); *B25J 9/0081* (2013.01); *B25J 9/161* (2013.01); *B25J 9/1689* (2013.01)

(58) Field of Classification Search
CPC ...... B25J 9/1664; B25J 9/1689; B25J 9/0081; B25J 9/161; G05B 19/39298; G05B 19/423; G05B 19/425
USPC .................. 700/245, 246, 250; 901/1, 8, 16
See application file for complete search history.

(56) References Cited

U.S. PATENT DOCUMENTS

| | | | |
|---|---|---|---|
| 9,902,059 B2 * | 2/2018 | Sonoda | B25J 9/16 |
| 2017/0095932 A1 * | 4/2017 | Murakami | B25J 13/085 |
| 2021/0078172 A1 * | 3/2021 | Cao | G01C 21/20 |
| 2022/0175472 A1 * | 6/2022 | Brisson | B25J 9/163 |
| 2022/0291685 A1 * | 9/2022 | Inacio De Matos | G05D 1/0214 |

FOREIGN PATENT DOCUMENTS

JP    2018-051653 A    4/2018

* cited by examiner

*Primary Examiner* — Dalena Tran
(74) *Attorney, Agent, or Firm* — Oliff PLC (57) ABSTRACT

A supporting apparatus for programing a robot operation has a display by which an operator sees a movement trajectory corresponding to a movement of the robot and by which the operator is supported to provide a program including moving order and non-moving order. The supporting apparatus for programing has a first operating portion describing a target position of each of the moving orders superimposed with the movement trajectory by using a first code, and a second operating portion describing a number of the non-moving orders operated at the target position by using a second code.

12 Claims, 8 Drawing Sheets

SUPPORTING APPARATUS FOR PROGRAMMING A ROBOT OPERATION

CROSS-REFERENCE TO RELATED APPLICATION

This application is based on and claims the benefit of priority from earlier Japanese Patent Application No. 2019-226195 filed Dec. 16, 2019, the description of which is incorporated herein by reference.

BACKGROUND

1. Technical Field

The present disclosure rerates to a supporting apparatus for programming which is suitable for a program of an operation of an industrial robot.

2. Related Art

The supporting apparatus which displays visually recognized diagrams of a movement trajectory of a robot, an original position of the robot, and a target position of the robot superimposing with the image of the robot in order to make an operator recognize the movement of the robot is described in the patent document (Japanese laid open patent publication 2018-51653).

The commanding orders to the robot usually include a moving order which makes the robot to move and a non-moving order which makes the robot to stay. In the case when the apparatus described in the patent document is used as a supporting apparatus for programming a robot operation, such apparatus has following problems. As the program of the robot usually includes a plurality of non-moving orders after the robot follows the moving order, the operator should have a difficulty to recognize a plurality of non-moving orders because many diagrams indicating the non-moving orders are gathered and overwrapped each other.

SUMMARY

The object of the present disclosure is to make the operator recognize the content of the non-moving orders when such non-moving orders are displayed by using the diagrams in the supporting apparatus for programming.

The first disclosure is a supporting apparatus which has a display showing a movement trajectory corresponding to the movement of the robot and which supports to provide the program including the moving order and the non-moving order. The supporting apparatus of the first disclosure has a first operating portion showing the movement trajectory superimposed with the original position and the target position as well as a second operating portion showing the number of the non-moving orders operated at the target position.

According to the first disclosure, the movement trajectory of the robot corresponding to the actual movement of the robot is shown on the display. The supporting apparatus supports to provide the program including the moving order and the non-moving order by using the display.

As the first operating portion indicates the target position of the moving order by using a first code, the operator could recognize the target position in the movement trajectory only by finding the position of the first code. As the second operating portion indicates the number of the non-moving orders at the target position by using a second code, the operator could recognize how many times the non-moving orders are operated only by finding the second code. Accordingly, the situation of many diagrams indicating the corresponding meaning of the non-moving order are gathered and overwrapped each other is effectively avoided, so that the operator could recognize how many times the non-moving orders are operated.

Since the second disclosure has the second code indicating the numeral which corresponds to the number of the non-moving orders, the operator could understand how many times the non-moving orders are operating.

In the case when the target positions of a plurality of moving orders are identical and become a common target position, it becomes to be difficult to show the non-moving orders done at the common target position any times after the moving order is completed.

The second operating portion of the third disclosure shows the number of the non-moving orders done at the common target position by using the second code and by corresponding the moving order. Accordingly, the number of the non-moving orders operated after each of the moving order is shown by using the second code, so that the operator could understand how many non-moving orders are operated after the corresponding moving order. As this third disclosure also does not use as much as diagrams each of which corresponds to a plurality of non-moving orders, such situation many diagrams displayed at the common target position could be avoided.

The second operating portion of the fourth disclosure so describes a plurality of second codes which is corresponding to a plurality of moving orders that a part of the second codes are overwrapped each other, so that the area showing a plurality of the second code could be limited and the operator could recognize each of a plurality of second codes.

The second operating portion of the fifth disclosure so describes a plurality of second codes that a plurality of second codes are arranged in chronological order. Accordingly, the operator could recognize how to operate the non-moving order after each of a plurality of moving orders is completed.

The second operating portion of the sixth disclosure is able to select the second code at the common target position, and the second operating portion also is able to edit the moving order as well as the non-moving order of the selected second code. In the case when the operator wishes to edit the moving orders to move the common target position as well as the non-moving orders operated thereafter, the operator could select the corresponding second code, so that the operator could edit the moving order and the non-moving order easily.

The supporting apparatus for programming of the seventh disclosure has a third operating portion showing a number of the target positions where the target positions are identical to the common target position by using a third code. Accordingly, the operator could recognize how many times to move the common target position where the non-moving orders are completed by finding the third code.

The third operating portion of the eighth disclosure is able to select the third code, and the second operating portion of the eighth disclosure shows a number of the non-moving orders which is related to the moving order moving to the common target position in a case when the third code is selected. Accordingly, when the operator wishes to understand the detail of the non-moving order operated at the common target position, the operator could select the third code.

The second operating portion of the ninth disclosure shows a total sum of the non-moving orders at the common target position by using the second code. The operator could recognize the non-moving orders operated at the common target position.

The second operating portion of tenth disclosure is able to select the second code, and the second operating portion shows the non-moving order which is related to the moving order moving to the common target position in a case when the second code is selected. Accordingly, the operator could understand the detail of the non-moving orders at the common target position.

The second operating portion of the eleventh disclosure describes a numeral corresponding to the total sum of the non-moving orders operated at the target position as well as a numeral corresponding to a chronological order of the under operating non-moving order. Accordingly, the operator could recognize the total number of the non-moving orders at the common target position and the chronological order of the non-moving order under operating.

The display of the twelfth disclosure is able to show the movement trajectory from various viewpoints, and the second operating portion of the twelfth disclosure describes the second code as a front view even in the case when the viewpoint is varied. Accordingly, the operator could program by using various viewpoints of the movement trajectory. The operator also could recognize the number of the non-moving orders by using the second code.

DETAILED DESCRIPTION OF THE PREFERRED EMBODIMENTS

First Embodiment

Figure 1:
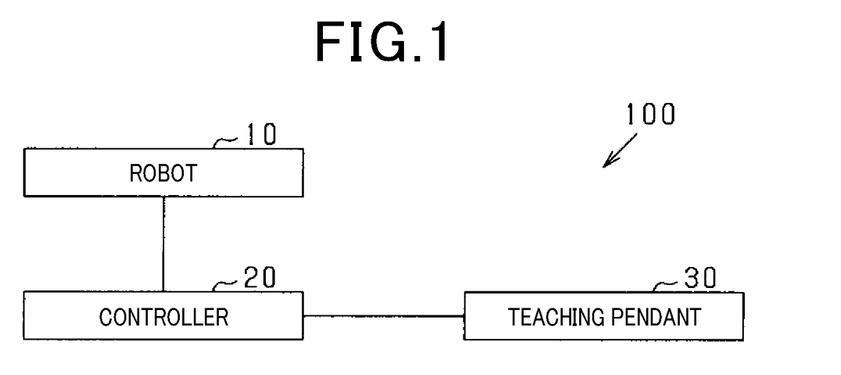
FIG. 1 is a block diagram of a robot system.

The first embodiment of the present disclosure applying an industrial robot used in a factory is explained hereinafter. As shown in FIG. 1, a robot system includes a robot 10, a controller 20, and a teaching pendant 30.

The robot 10 has mulch (6 for example) axis arms, each axis arm is driven by a motor mounted in each arm. A work transferred by the robot 10 is grasped by a hand positioned at the end of the last (sixth) axis arm.

The controller 20 of the robot 10 includes a microcomputer having CPU, ROM, RAM and in and out interfaces. The controller 20 controls the robot 10 by using the program installed in the RAM. Such program is installed by the operator. The controller 20 also controls the robot 10 by a commanding order from the teaching pendant 30 operated by the operator.

The controller 20 has an information relating to the movement of the robot 10 such as a target position as well as a movement trajectory toward to the target position. Since the controller 20 completes the program, the controller 20 has the information of the under operating program and the information of the next operating program. The controller 20 outputs the information of the movement of the robot 10 to the teaching pendant 30.

Figure 6:
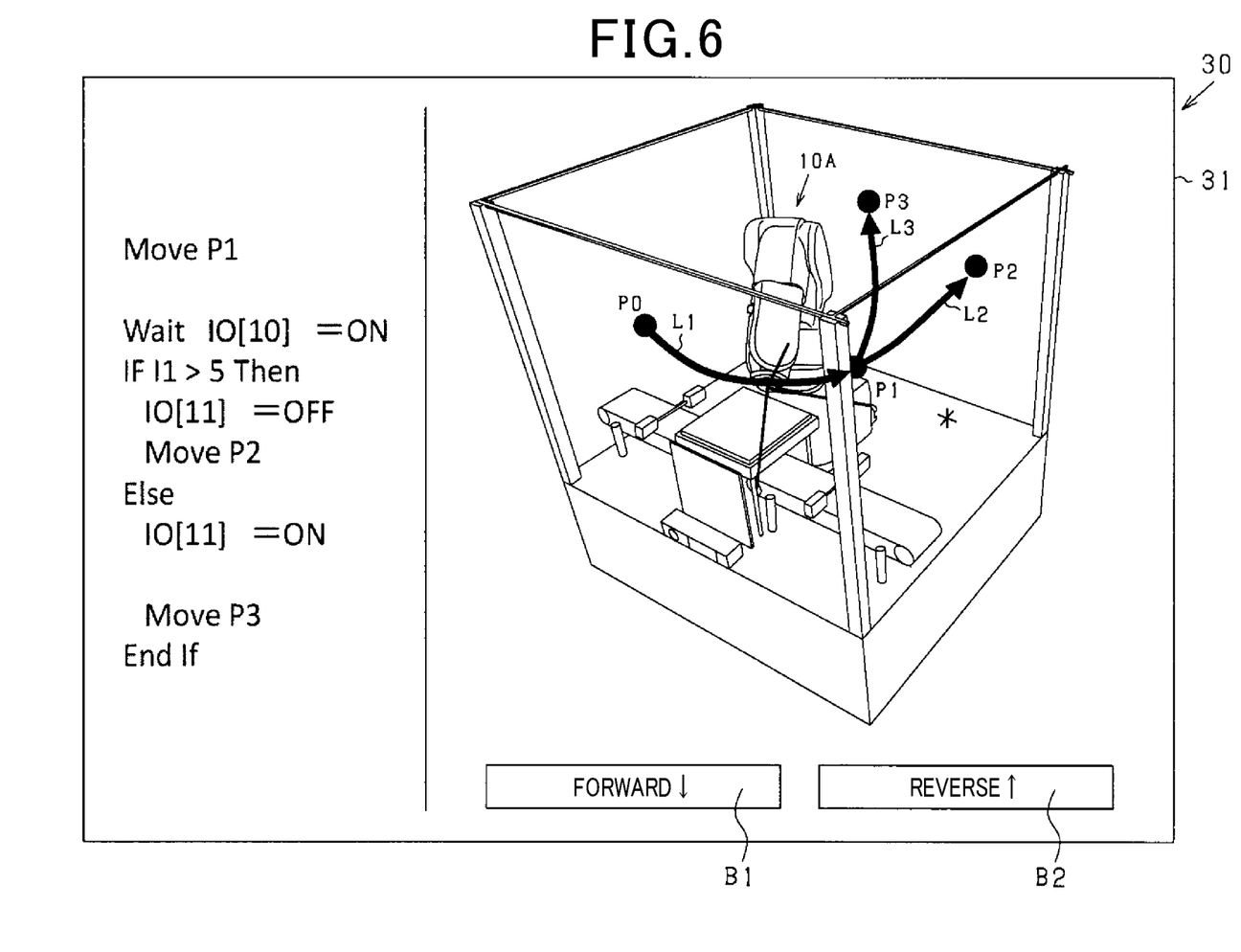
FIG. 6 shows an example of a display of a teaching pendant.

The teaching pendant 30 includes the microcomputer same as the controller 20, various key switches, and a display 31 (shown in FIG. 6). The operator inputs the information by using the key switches. The operator also inputs the information by using icons shown on the display 31 so that the display 31 is a touch panel.

The operator may create the program by operating the teaching pendant 30 so that the teaching pendant 30 is a supporting apparatus for programing a robot operation. The teaching pendant 30 produces a simulation image and movement trajectories L1-L3 (shown in FIG. 4) based on the created program and the movement of the robot 10 controlled by the controller 20. The teaching pendant 30 shows the simulation image and the movement trajectories L1-L3 on the display 31. The teaching pendant 30 has a first operating portion, a second operating portion and a third operating portion.

Figure 2:
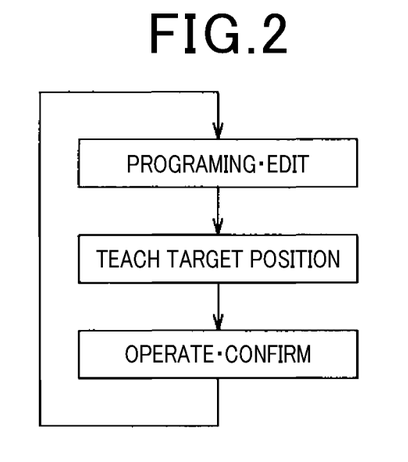
FIG. 2 is a flow chart showing a programing process.

The flow chart showing processes for completing the program is shown in FIG. 2. The operator completes these processes shown in FIG. 2 by using the teaching pendant 30.

As shown in FIG. 2, the operator provides and edits the program at first, such program includes a moving order by which the robot 10 is moved and a non-moving order by which the robot 10 is not moved. The operator makes the program by writing the command order in chronological order, and the operator edits the program based on the test result of the first made program.

The operator then teaches each target position based on the movement of the robot 10. The operator teaches the target position by directly writing the target position in the command order, or by pointing the target position in the simulation image.

The operator then operates the program and confirms the program. The operator operates and confirms the program by actually moving the robot 10 or by moving the robot 10 in the simulation image.

The supporting apparatus for programing of the present disclosure supports entire processes of above described process. Namely, the teaching pendant 30 is not limited for confirming the movement of the robot 10, but supports to make the program, to edit the program and to teach the target position.

Figure 3:
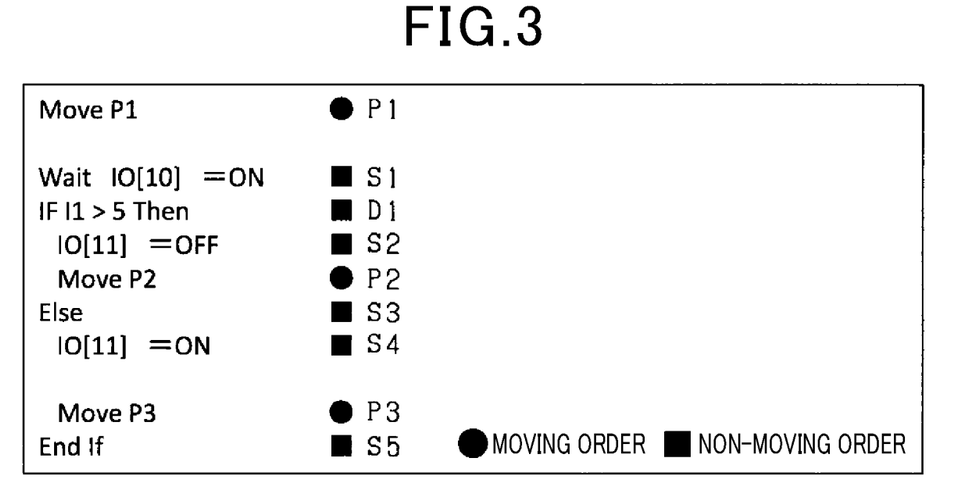
FIG. 3 shows a part of a program.

A part of the program is shown in FIG. 3. The actual program for operating the robot 10 may have several thousand lines of the commanding orders.

The commanding order of "Move P1" makes the controlling point of the robot 10 (the center point of the sixth arm) to move to the target position P1, so that this commanding order is a moving order. The commanding order of "Wait IO [10]=ON" makes the robot 10 to stay until In and Out port [10] becomes On, so that this commanding order is a non-moving order and a non-determining order. The commanding order of "IF I1>5 Then" decides whether or not the number of variables I1 is greater than 5, so that this commanding order is a non-moving order and a determining order. The commanding order of "IO [11]=OFF" makes the In and Out port [11] to turn off, so that this commanding order is a non-moving order and a non-determining order. The commanding order of "Move P2" makes the controlling point of the robot 10 to move toward the target position P2, so that this commanding order is a moving order. The commanding order of "Else" indicates the operation when above "IF I1>5" commanding order is not satisfied, so that this commanding order is a non-moving order and a non-determining order. The commanding order of "Move P3" makes the controlling point of the robot 10 to move toward the target position P3, so that this commanding order is a moving order. The commanding order of "End if" indicates the end of above described series of the commanding orders, so that this order is a non-moving order and a non-determining order.

As described above, the program for the robot 10 usually includes the non-moving orders more frequently than the moving orders. The program also includes a plurality of non-moving orders which are operated at the target position once the robot 10 moved such target position.

The target position of the moving order is described by using the diagram in the simulation image of the robot 10.

Figure 4:
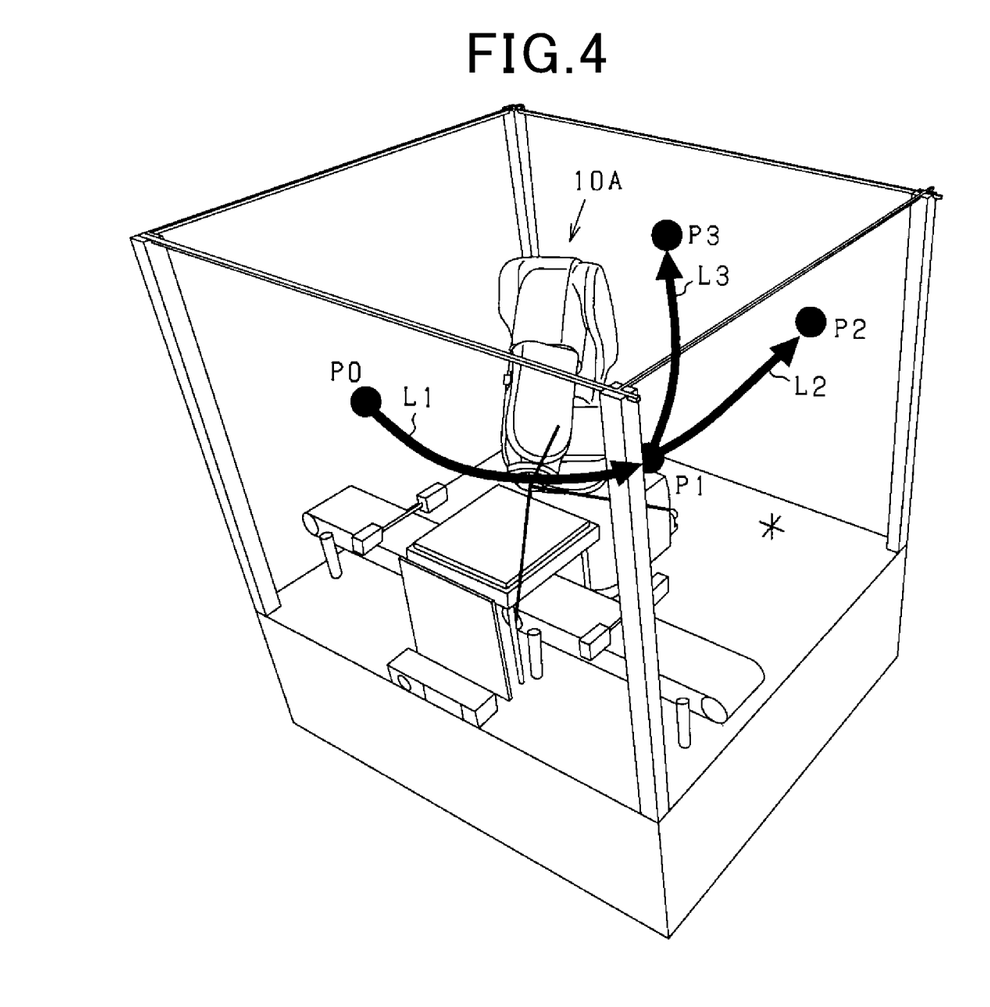
FIG. 4 shows a robot, a movement trajectory, and a target position.

FIG. 4 shows the robot 10, the movement trajectory L1-L3, and the diagrams indicating the target positions P0-P3. The image shown in FIG. 4 is an example of the image displayed on the display 31 (shown in FIG. 6) when the program described in FIG. 3 is provided or edited.

The display 31 of the teaching pendant 30 shows the movement trajectories L1-L3 with the image 10A of the robot 10. The operator may decide the area of the movement trajectory shown in the display 31. The operator may use the black circle P0 for indicating the original position and may use the black circle P1-P3 for indicating the target positions of the moving order. Accordingly, the teaching pendant 30 (the first operating portion) shows the target positions P1-P3 (black circles) superimposing on the movement trajectories L1-L3

In the case if the diagrams indicating the non-moving orders are described on the display 31 in additional to the black circles indicating the target positions, a plurality of diagrams are superimposed at the target position, so that the operator has a difficulty to distinguish the detail of the non-moving orders. In order to avoid such difficulty for the operator, the present disclosure uses an icon showing the number of the non-moving orders operated at the target position.

Figure 5:
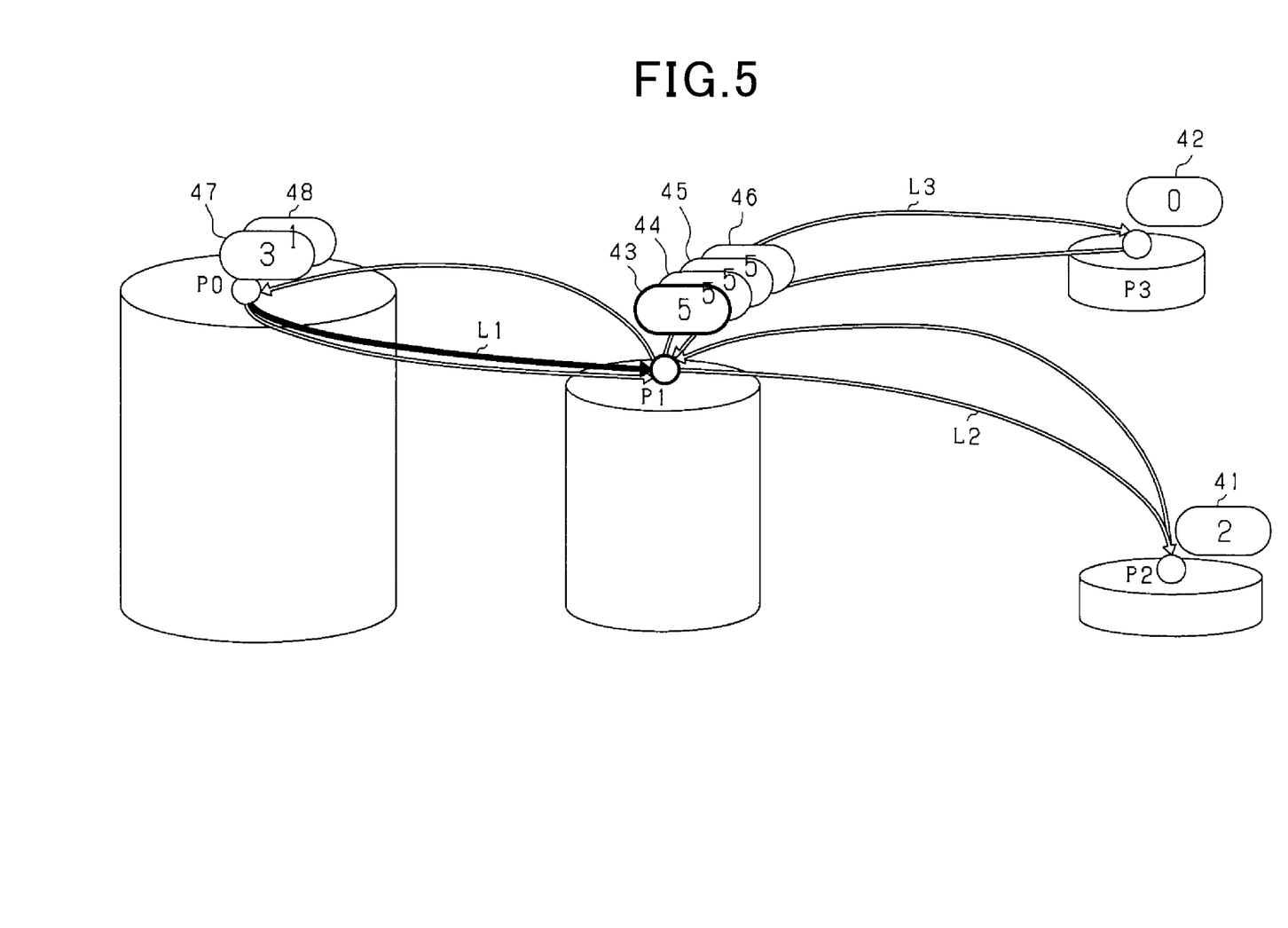
FIG. 5 shows points indicating a movement trajectory and a target position as well as icons indicating a number of non-moving orders.

As shown in FIG. 5, the icons 41-48 showing the numeral indicating the number of the non-moving orders operated at the target position, the movement trajectories L1-L3 and the white circles P0-P3 indicating the target positions are displayed. The white circle P0 represents the starting position where the robot 10 grasps the work, for example. The white circle P1 represents the target position where the product number of the work grasped by the robot 10 is detected, for example. The white circle P2 represents the target position where a certain kind work is kept, for example. The white circle P3 represents the target position where a different type work is kept, for example. The controlling point of the robot 10 moves the following movement of the starting position P0—the target position P1—the target position P2—the target position P1—the target position P3—the target position P1—the target position P0—the target position P1.

The teaching pendant 30 shows the icons 41-48 (second code) showing the numeral which indicates the number of the non-moving orders operated at each of the target position P0-P3.

An oval shape icon 41 positioned close to the target position P2 has a numeral of "2" which means the number of the non-moving order operated at the target position P2 are two (2). Similarly, the icon 42 indicates the numeral "0" which means the robot does not operate the non-moving order at the target position P3. The numeral of the icon 42 may be "1" which is the sum of the "1" time operation of the moving order and "0" time operation of the non-moving order. Therefore, the numeral shown in the icons 41, 42 indicates the operator the number which is corresponding to the number of the non-moving orders operated at the target positions P2, P3.

Since the position P1 is the target position of a plurality of moving orders, the position P1 is a common target position. The teaching pendant 30 shows icons 43-46 indicating the number of the non-moving orders operated at the common target position P1. Namely, same as icons 41, 42, these icons 43-46 indicate how many non-moving orders are operated each time after the robot 10 moves to the common target position P1. A part of these icons 43-46 are overwrapped each other. Namely, the next icon locates at upper right side of the front side icon, so that the icons 43-46 are positioned in chronological order. The front icon 43 indicates the first operation and the last icon 46 indicates the fourth operation.

The teaching pendant 30 shows the movement trajectory on the display by varying viewpoint, so that the operator could produce the program by changing the viewpoint on the display for showing the movement trajectory. In the case if the view of the icons is varied in accordance with the verification of the viewpoint, the operator may have a difficulty to find the meaning of the icons. In order to avoid such inconvenience of the operator, the present disclosure does not use the perspective view but always uses the front view of the icons 41-48 (shown in FIG. 5) even the viewpoint for the movement trajectory is varied.

The operator may select the circles P0-P3 as well as the icons 41-48 on the display 31 of the teaching pendant (the second operating portion) as shown in FIG. 6. The selected program is displayed on the display 31 of the teaching pendant 30 in the form that the operator may edit. When the operator pushes the forward button B1 (touch panel on the display 31), the displayed part of the program moves forward, on the other hand when the operator pushed the reverse button B2, the displayed part of the program moves reverse. As shown in FIG. 6, the selected part of the movement trajectory and the selected part of the program is displayed on the display 31 of the teaching pendant 30.

The operator may directly edit the selected part of the program displayed on the display 31. The operator also may edit the selected part of the program by changing the target position displayed on the display 31 in such a manner that the operator moves the position of the circle indicating the target position on the display 31. When the operator moves the circle, the target position in the program is changed from the original position to the new position.

Figure 7:
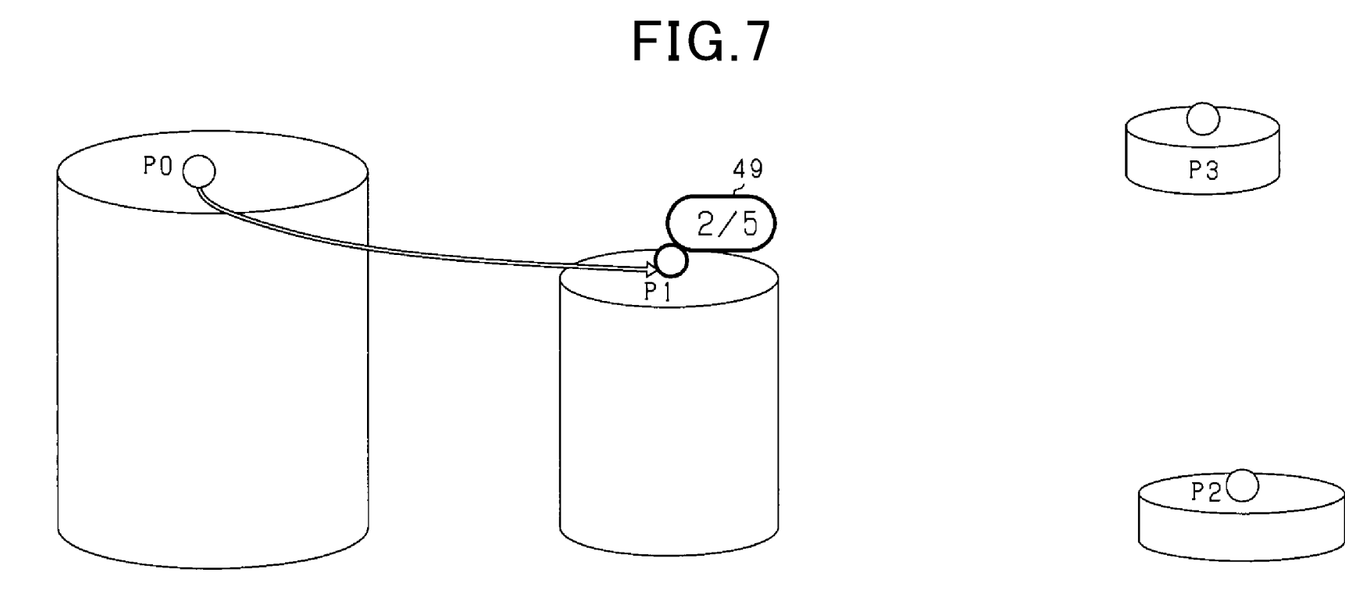
FIG. 7 shows a movement of a robot under operating.

The simulation image as well as the actual image of the movement of the robot 10 is displayed on the display 31 of the teaching pendant 30 as shown in FIG. 7. The icon 49 of FIG. 7 indicates total sum of the non-moving orders and the number of the current operating non-moving order. The numeral "5" means the total sum is five (5) and the numeral "2" means the current operating order is the second non-moving order. The display 31 shown in FIG. 7 only shows the icon 49 indicating under operating order and the target position P1 where the non-moving order is under operated with bold line and does not show the other icons located close to the other target positions P0, P2, P3.

The above described disclosure has the following effects. The teaching pendant 30 (the first operating portion) displays the circles P0-P3 at the corresponding positions of each of the target position of the moving order. The teaching pendant 30 also displays each of the target position P0-P3 superimposing on the movement trajectories L1-L3 of the robot 10. Therefore, the operator could recognize each of the target position P0-P3 in the movement trajectories L1-L3 by finding the circles P0-P3.

As the icons 41-48 indicate the numeral which corresponds to the number of the non-moving orders operated at each of the target position P0-P3, the operator could recognize how many times the non-moving orders are operated by finding the numeral.

In the case when the target position P1 is the common target position where the target position of a plurality of moving orders, each of icons 43-46 indicates the number of the non-moving orders operating at the common target position P1 in chronological order of each of icons 43-46. Accordingly, the operator could recognize how many times non-moving orders are operated after the each of the moving order. As each of the non-moving order do not have its own icon indicating the meaning of each of the non-moving order, the number of the icons located close to the common target position should be limited.

A group of icons 43-46 and another group of icons 47,48 is displayed on the display 31 of the teaching pendant 30 in such manner that the icons 43-46, 47, 48 are overwrapped each other, so that the area showing such icons 43-46, 47, 48 could be limited and that the operator could recognize each of the icons 43-46, 47, 48.

A group of icons 43-46 and another group of icons 47,48 is displayed on the display 31 of the teaching pendant 30 in such manner that the icons 43-46, 47, 48 are displayed in chronological order. Accordingly, the operator could realize the meaning of the non-moving orders operated after each of the moving order.

The icons 43-46 positioned close to the common target position P1 on the display 31 of the teaching pendant 30 could be selected by the operator, so that the operator could select the icon which corresponds to the moving order or the non-moving order of the program and that the operator could edit such program. Accordingly, as the selected icon represents the program, the operator could visually find the program which operator wish to edit.

A couple of numerals one of which indicates the total sum of the non-moving orders operated at the target position P0 P3 and another one of which indicates the chronological order of the under operating non-moving order are displayed on the display 31 of the teaching pendant 30 such as shown in FIG. 7. Therefore, it becomes easy for the operator to recognize the position of the target position where the non-moving order is operating, the total sum of the non-moving orders at such target position, and the progress of the non-moving orders.

The movement trajectories L1-L3 of the robot 10 is displayed in the display 31 of the teaching pendant from the various viewpoints, so that the operator could make the program by using the movement trajectories L1-L3 from different viewpoint. The icons 41-48 are always displayed in the display 31 as the front view even the movement trajectories L1-L3 are varied, so that the operator could recognize the number of the non-moving orders displayed on the icons 41-48 regardless of the viewpoints.

The above described disclosure could be modified as follows. Though the disclosure shown in FIG. 7 displays a couple of numerals one of which indicates the total sum of the non-moving orders operated at the target position P0 P3 and another one of which indicates the chronological order of the under operating non-moving order, the latter one may be eliminated.

Though the icons 43-46, 47, 48 are overwrapped each other in FIG. 5, these icons 43-46, 47, 48 may be displayed on the display 31 separately. The operator still distinguishes each of these icons 43-46, 47, 48.

Second Embodiment

The second embodiment is so explained hereinafter that the difference from the first embodiment is mainly explained. The same elements as the first embodiment are not explained but put the same reference numerals.

Figure 8:
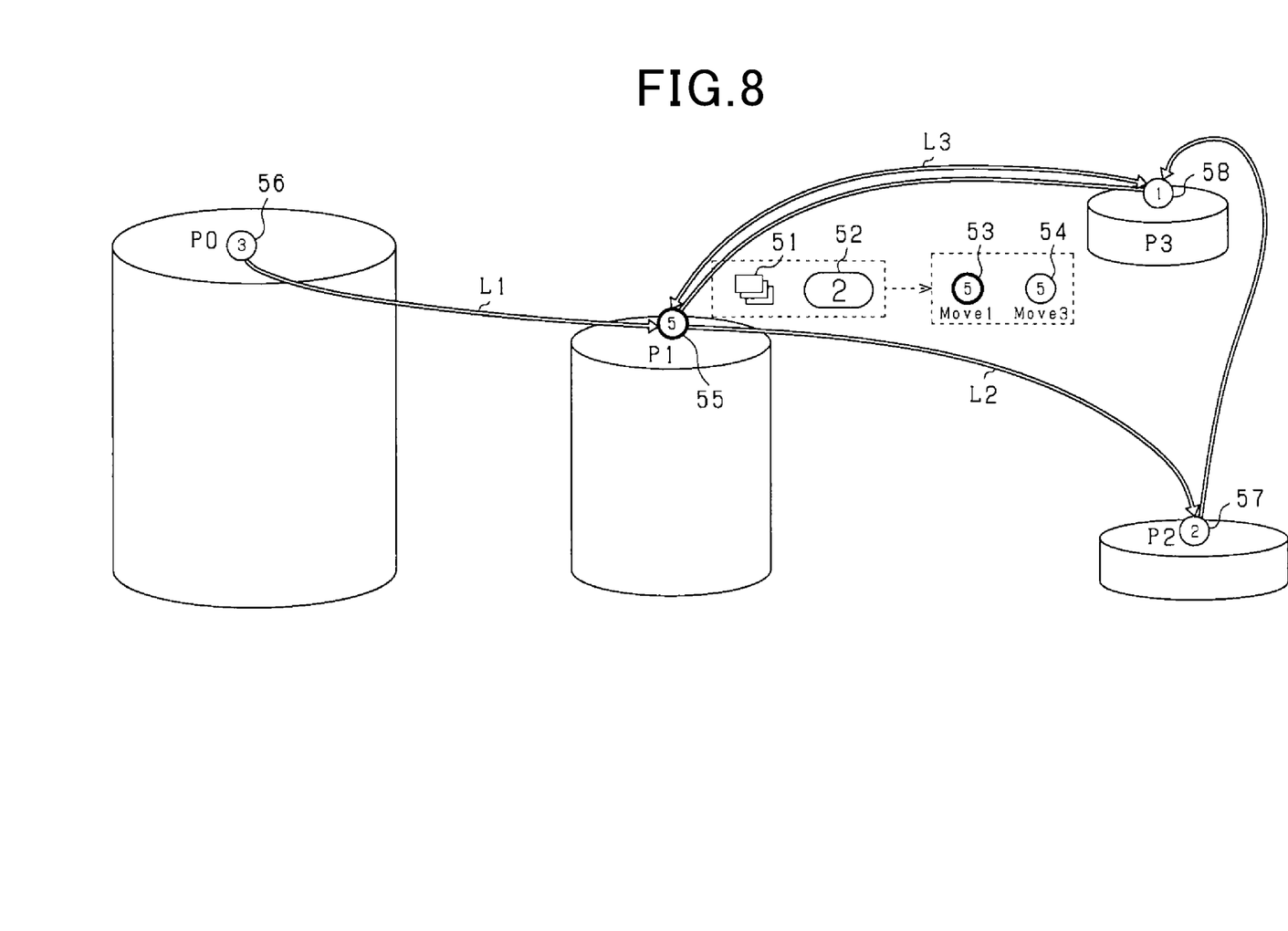
FIG. 8 shows a movement trajectory and icons of the second embodiment.

As shown in FIG. 8, the display 31 of the teaching pendant 30 (third operating portion) displays the icon 51 which indicates the common target position P1, namely, the target position P1 is the target position of a plurality of moving orders. The icon 52 (third code) indicates how many times the target position P1 becomes the common target position. The numeral of "2" shown on the icon 52 indicates the target position P1 becomes the common target position two (2) times. Accordingly, the operator could understand the situation of the non-moving orders.

The icon 52 is so displayed on the display 31 of the teaching pendant 30 that the operator could select the same. When the operator selects the icon 52, the moving order of "Move 1" and its icon 53 as well as the moving order of "Move 3" and its icon 54 are displayed on the display 31. Each icon 53, 54 shows the numeral corresponding to the total sum of the non-moving orders. The example shown in FIG. 8 indicates the non-moving orders are operated five (5) times after the moving order of "Move 1" and the other non-moving orders are operated five (5) times after the moving order of "Move 3".

Third Embodiment

The third embodiment is so explained hereinafter that the difference from the first embodiment is mainly explained. The same elements as the first embodiment are not explained but put the same reference numerals.

Figure 9:
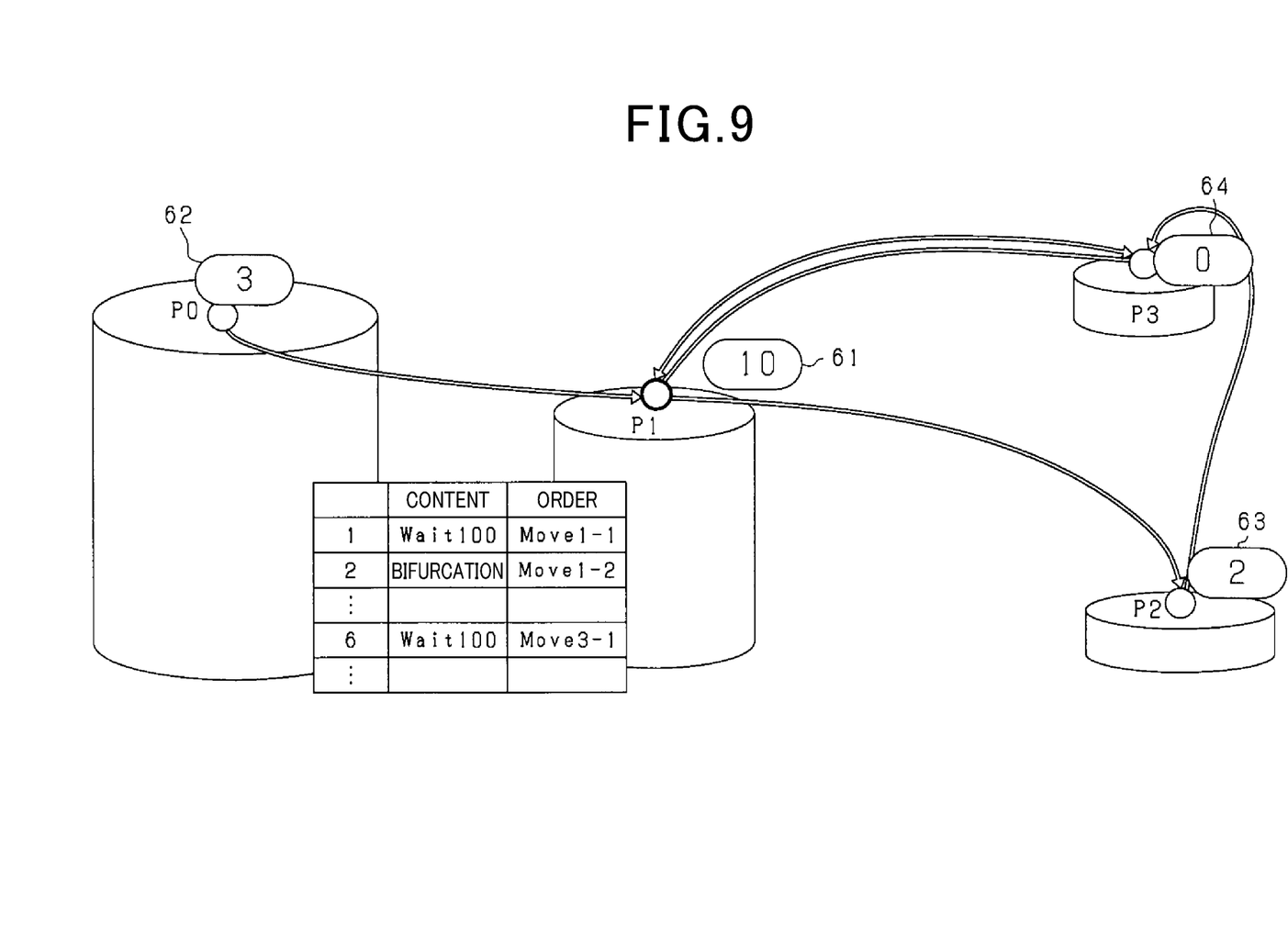
FIG. 9 shows a movement trajectory, icons and a table of the third embodiment.

As shown in FIG. 9, the icon 61 displayed in the display 31 of the teaching pendant 30 (second operating portion) indicates the total sum of the non-moving orders operated at the common target position P1. The numeral of "10" shown on the icon 61 means the toral sum of five (5) operations of the non-moving orders after the moving order of "Move 1" and five (5) operations of the non-moving orders after the moving order of "Move 3". The other icons 62, 63, 64 also shows the numeral corresponding to the total sum of the non-moving orders operated at each of the target position P0, P2, P3. Accordingly, the operator could understand the situation of the non-moving orders.

The icon 61 is so displayed on the display 31 of the teaching pendant 30 that the operator could select the same. When the operator selects the icon 61, the moving order of "Move 1" and the moving order of "Move 3" both has the target position of the common target position P1 as well as the table explaining the non-moving orders operating after the respective moving orders are displayed on the display 31 of the teaching pendant 30. The table of FIG. 9 explains the first non-moving order after the moving order of "Move 1"

is "Wait 100", the second non-moving order is "bifurcation", and the first non-moving order after the moving order of "Move 3" is "Wait 100".

The icon 61 is so displayed on the display 31 of the teaching pendant 30 (second operating portion) that the operator could select the same. When the operator selects the icon 61 showing the toral sum of the non-moving orders, the operator could understand the detail of the program of the non-moving order operated at the common target position P1.

Figure 10:
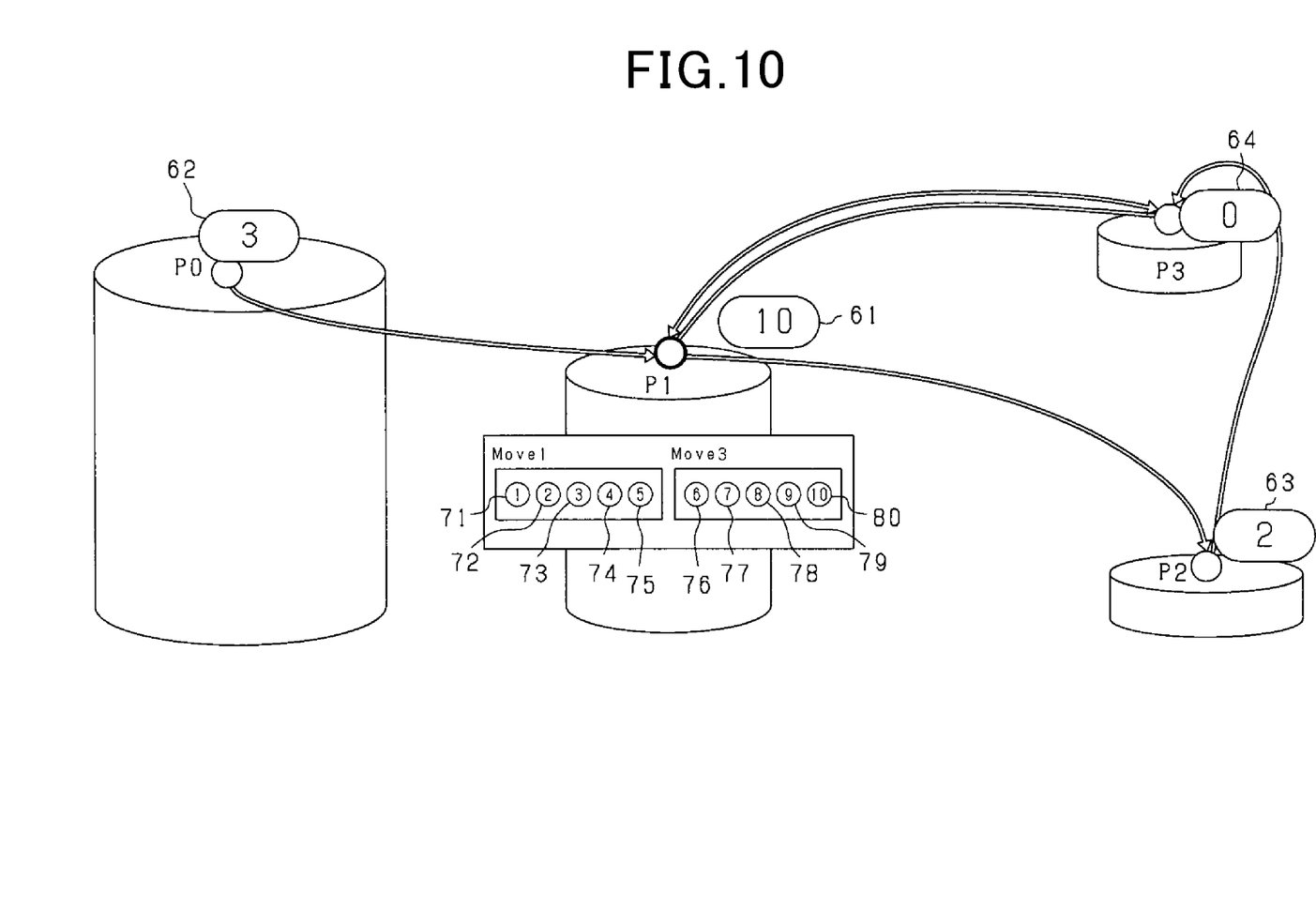
FIG. 10 shows the modified third embodiment.

As shown in FIG. 10, the icon 61 displayed in the display 31 of the teaching pendant 30 (second operating portion) indicates the moving order of "Move 1" and the moving order of "Move 3" both of which has the same target position of the common target position P1 as well as the first group of icons 71-75 indicating the non-moving orders after the moving order of "Move 1" and the second group of icons 76-80 indicating the non-moving orders after the moving order of "Move 3".

Modifications

The above described embodiments could be modified as follows. The icons displayed on the display 31 of the teaching pendant 30 may be switched between the turning on condition the icon is displayed and the turning off condition the icon is disappeared.

The target position may be indicated by the other diagram (first code) than the circle. The diagram (first code) may include letter, mark, picture and other diagram having a meaning.

The number of the non-moving orders may be described by the other diagram (second code) than the numeral. The diagram (second code) may be the icon having the symbol such as poles indicating the number of the non-moving order. The icon having more poles means there are many non-moving orders operated at the target position. The diagram (second code) may also be the icon which color could be varied depend on the number of the non-moving orders. As the color of the icon could be detected even from the perspective view, the icon having the color may be varied from the same viewpoint of the movement trajectory when the same is varied.

Though above described disclosure uses the microcomputer installed in the teaching pendant 30 for supporting the programing of the robot 10, the microcomputer installed in the controller 20 may support the programing by using the monitor (display).

The present disclosure could be used in a goggle type apparatus which applies virtual image on the real image. Such apparatus applies the virtual image of the movement trajectories L1-L3, the target position P0-P4, and icons 41-48, 53-58, 61-64 (second code) on the real image of the robot 10 which the operator actually see through the goggle.

The other type of mulch axis robot 10 than that disclosed in the drawings could be used.

What is claimed is:

1. A supporting apparatus for programming an operation of a robot, the supporting apparatus (i) comprising a display showing a movement trajectory corresponding to a movement of the robot and (ii) having a program including at least one moving order and at least one non-moving order, and the supporting apparatus further comprising:
   a first operating portion showing on the display a target position of each of the moving orders superimposed on the movement trajectory by using a first code; and
   a second operating portion showing on the display a number of the non-moving orders operated at each of the target positions by using a second code, wherein
   the second code indicates how many times the non-moving orders are operated at the corresponding target position without displaying on the display any diagram that indicates a corresponding meaning of a said non-moving order.

2. The supporting apparatus as claimed in claim 1, wherein
   the second code includes a numeral which corresponds to the number of the non-moving orders operated at the corresponding target position.

3. The supporting apparatus as claimed in claim 1, wherein
   the second operating portion shows on the display a number of the non-moving orders operated at a common target position at which the target positions of a plurality of the moving orders are identical by using the second code, and
   the second operating portion shows on the display a number of the non-moving orders operated at the common target position for each of the plurality of the moving orders at the common target position.

4. The supporting apparatus as claimed in claim 3, wherein
   the second operating portion shows on the display the number of the non-moving orders operated at the common target position for each of the plurality of the moving orders at the common target position by way of a plurality of the second codes that correspond to the plurality of the moving orders, a part of each of the plurality of second codes being overwrapped with each other.

5. The supporting apparatus as claimed in claim 4, wherein
   the plurality of the second codes corresponding to the plurality of the moving orders at the common target position are arranged in chronological order.

6. The supporting apparatus as claimed in claim 3, wherein
   the second operating portion is configured to select the second code at the common target position, and the second operating portion is configured to edit the moving order and a said non-moving order corresponding to the selected second code.

7. The supporting apparatus as claimed in claim 3, wherein
   the supporting apparatus for programming further comprises a third operating portion showing a number of the target positions identical in position to the common target position by using a third code.

8. The supporting apparatus as claimed in claim 7, wherein
   the third operating portion is configured to select the third code, and
   the second operating portion shows a number of the non-moving orders related to a said moving order moving to the common target position in a case when the third code is selected.

9. The supporting apparatus as claimed in claim 3, wherein
   the second operating portion shows a total sum of the non-moving orders at the common target position by using the second code.

10. The supporting apparatus as claimed in claim 9, wherein the second operating portion is configured to select the second code, and the second operating portion is configured to show a said non-moving order corresponding to the selected second code in such a manner that the said non-moving order is related to the moving order moving to the common target position in a case when the second code is selected.

11. The supporting apparatus as claimed in claim 1, wherein
the second operating portion shows a numeral corresponding to a total sum of the non-moving orders operated at the corresponding target position as well as a numeral corresponding to a chronological order of each of the operating non-moving orders.

12. The supporting apparatus as claimed in claim 1, wherein
the display is configured to show the movement trajectory from various viewpoints, and
the second operating portion shows the second code as a front view in a case when the viewpoint is varied.

* * * * *